US 8,684,891 B1

(12) United States Patent
Davidson

(10) Patent No.: US 8,684,891 B1
(45) Date of Patent: Apr. 1, 2014

(54) WAIST-MOUNTED PARACHUTE DEPLOYMENT AND RETRACTING SYSTEM

(76) Inventor: Archie Davidson, New York, NY (US)

(*) Notice: Subject to any disclaimer, the term of this patent is extended or adjusted under 35 U.S.C. 154(b) by 470 days.

(21) Appl. No.: 13/091,368

(22) Filed: Apr. 21, 2011

Related U.S. Application Data

(60) Provisional application No. 61/343,124, filed on Apr. 22, 2010.

(51) Int. Cl.
*A63B 71/00* (2006.01)
*A63B 21/008* (2006.01)
*B64D 17/00* (2006.01)
*B64D 17/02* (2006.01)

(52) U.S. Cl.
USPC .............. 482/74; 482/111; 244/142; 244/145

(58) Field of Classification Search
USPC ............... 482/74, 111, 59, 58, 14, 51, 55, 56, 482/131, 139, 148, 54; 480/55; 114/53, 114/311; 280/213, 810; 446/34, 49–53; 244/151 R, 143, 145, 147, 148, 110 D, 244/113, 142
See application file for complete search history.

(56) References Cited

U.S. PATENT DOCUMENTS

| | | | |
|---|---|---|---|
| 2,933,272 A * | 4/1960 | Sinclair | 244/113 |
| 2,972,457 A | 2/1961 | Steinthal | |
| 3,545,790 A * | 12/1970 | Davis et al. | 280/288.4 |
| 3,949,520 A * | 4/1976 | Lebensfeld | 446/51 |
| 3,993,323 A * | 11/1976 | Lussier | 280/288.4 |
| 4,527,794 A | 7/1985 | Dunn | |
| 4,753,400 A * | 6/1988 | Reuter et al. | 244/11 OR |
| 4,781,649 A * | 11/1988 | Nagano | 446/435 |
| 4,854,572 A | 8/1989 | Knight | |
| 5,217,186 A | 6/1993 | Stewart et al. | |
| 5,460,589 A | 10/1995 | Dunn | |
| 5,472,394 A | 12/1995 | Michaelson | |
| 6,050,524 A * | 4/2000 | Haggard | 244/151 A |
| 7,114,457 B1 | 10/2006 | Stiers | |
| 8,240,610 B1 * | 8/2012 | Cooper | 244/143 |
| 8,371,993 B2 * | 2/2013 | Brown et al. | 482/74 |
| 2008/0161167 A1 | 7/2008 | Ottaviani | |
| 2010/0108817 A1 * | 5/2010 | Fox, Jr. | 244/142 |

* cited by examiner

*Primary Examiner* — Loan Thanh
*Assistant Examiner* — Megan Anderson
(74) *Attorney, Agent, or Firm* — Goldstein Law Offices, P.C.

(57) ABSTRACT

A waist-mounted parachute deployment and retracting system for training runners and other athletes that provides a user a method for selectively deploying and retracting the parachute during training without stopping or breaking stride. The parachute provides drag to increase resistance to improve performance by overloading the muscles. The user selectively deploys the parachute by pressing a button to release and open the parachute. Air flow created by the user's forward motion flows through a pair of ports on the side of a case holding the parachute. The air flow expands the parachute, causing the cords attaching the parachute to the case to extend and wind a recoil mechanism. The user selectively retracts the parachute by pressing a button to close the parachute and the recoil mechanism rewinds the cords, pulling the parachute into the case, ready to be deployed again when desired.

10 Claims, 5 Drawing Sheets

WAIST-MOUNTED PARACHUTE DEPLOYMENT AND RETRACTING SYSTEM

CROSS-REFERENCE TO RELATED APPLICATIONS

This application is a nonprovisional utility application of the provisional patent application Ser. No. 61/343,124 filed in the United States Patent Office on Apr. 22, 2010 and claims the priority thereof.

BACKGROUND OF THE INVENTION

The invention relates generally to a waist-mounted parachute deployment and retracting system for training runners and other athletes. More particularly, the invention relates to a waist-mounted parachute deployment and retracting system for training runners and other athletes that provides the athletes a method to selectively deploy and retract the parachute during training without stopping or breaking stride.

Runners and other athletes, such as skaters and walkers, try to improve strength and speed by training, both continually practicing their sport of choice, but also by adding resistance to force muscles to work harder based on the overload principle. Once the resistance is removed, the athlete may achieve an increase in peak performance.

Many athletes use weights to increase the effort required for a particular physical movement to increase speed, strength and endurance. Some carry hand weights, weighted wrist and ankle straps or wear a vest with weights. The weights are localized in effect and stress the joints close to where the weights are carried or worn. The weights are static, always requiring the same amount of effort to carry. The user must continue to carry the weights around to return them to storage, sometimes long after the workout is complete.

Some athletes, particularly runners, use airfoils, sails, or parachutes to add resistance as they practice. Once they were used only by sprinters, for sprint or interval training, and now they are used by distance runners, as well as skiers, skaters, and walkers to add air resistance training to their workouts. The parachute or airfoil is attached to the athlete's back and billows behind during training, creating drag, which the athlete must work harder to overcome. It is a dynamic system, because the faster the athlete runs, skates, walks, or moves, the more resistance the system creates.

Parachutes and related devices are designed for short intervals, such as the straight-away of a track, since they are not beneficial on curves. Most parachutes or foils do not easily detach or retract and the athlete must halt training to remove them. Some completely detach by various quick release mechanisms, but the athlete or trainer is forced to gather the parachute up and refold it for storage. Some retract just the cords, leaving the parachute dangling behind the athlete.

While these units may be suitable for the particular purpose employed, or for general use, they would not be as suitable for the purposes of the present invention as disclosed hereafter.

SUMMARY OF THE INVENTION

It is an object of the invention to produce a system that selectively provides resistance in training a user to improve performance. Accordingly, a waist-mounted parachute deployment and retracting system allows the user to selectively deploy and retract a parachute that provides resistance to the user.

It is another object of the invention to produce a system that provides resistance by interval training. Accordingly, a waist-mounted parachute deployment and retracting system allows the user to selectively deploy and retract the parachute for periods of time to create intervals of varying intensity while exercising without stopping or breaking stride.

It is a further object of the invention to produce a system that provides resistance in training that is deployed and retracted without stopping an exercise. Accordingly, a waist-mounted parachute deployment and retracting system allows the user to selectively deploy and retract the parachute while exercising by pushing an open button to deploy and a close button to retract.

It is yet another object of the invention to produce a system that provides resistance in training that is convenient to use. Accordingly, a waist-mounted parachute deployment and retracting system is attached to a belt in a case worn on a back of a user that retracts the parachute completely and conveniently so that the parachute does not have to be separately retrieved and refolded.

The invention is a waist-mounted parachute deployment and retracting system for training runners and other athletes that provides a user a method for selectively deploying and retracting the parachute during training without stopping or breaking stride. The parachute provides drag to increase resistance to improve performance by overloading the muscles. The user selectively deploys the parachute by pressing a button to release and open the parachute. Air flow created by the user's forward motion flows through a pair of ports on the side of a case holding the parachute. The air flow expands the parachute, causing the cords attaching the parachute to the case to extend and wind a recoil mechanism. The user selectively retracts the parachute by pressing a button to close the parachute and the recoil mechanism rewinds the cords, pulling the parachute into the case, ready to be deployed again when desired.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 4:
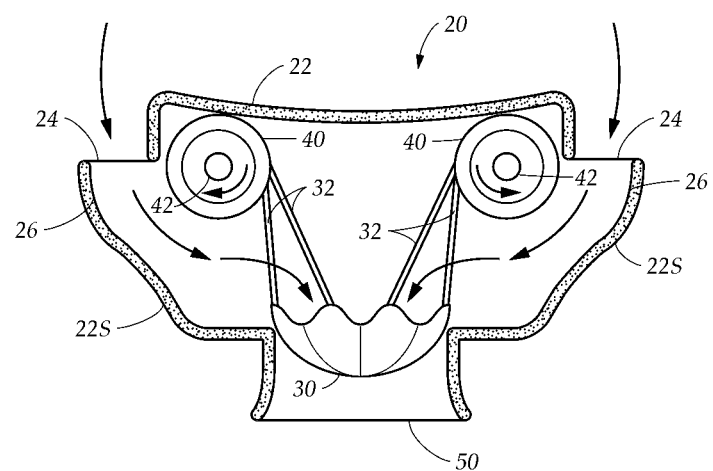
FIG. 4 is a cross-sectional view of the waist-mounted parachute deployment and retracting system from the top, showing a parachute, a recoil mechanism, and a pair of air channels inside a case.

FIG. 4 illustrates a cross-sectional view of a waist-mounted parachute deployment and retracting system 20 for training runners and other athletes. The system provides a user a method to selectively deploy and retract a parachute 30 during training without stopping or breaking stride. The parachute 30 provides drag to increase resistance to improve performance by overloading the muscles. The parachute 30 is in a case 22 attached to a belt that is worn around a user's waist. The parachute 30 is anchored by a plurality of cords 32 connected to a recoil mechanism 40 that has a pair of mainsprings 42. The mainsprings 42 store energy as the cords unwind during deployment of the parachute. The case 22 has a pair of ports 24 facing in a direction same as the user, leading to a pair of air channels 26, and an aperture 50 for deploying and retracting the parachute 30. Air flows into the pair of ports 24 caused by the user's forward motion and into the channel 26 forcing the parachute 30 out the aperture once the user selectively releases the parachute 30. The air flow expands the parachute 30, causing the cords 32 attaching the parachute 30 to the case 22 to extend and wind the recoil mechanism. When the user desires to retract the parachute 30, the cords 32 are selectively retracted by the recoil mechanism 40 using the energy stored in the mainsprings 42, pulling the parachute 40 through the aperture 50 for storage in the case 22. The parachute 30 is ready to be deployed again when desired and selectively deploying and retracting the parachute 30 is repeatable as often as desired during a training session to generate an interval training routine or to reduce resistance when rounding curves on a track.

Figure 2A:
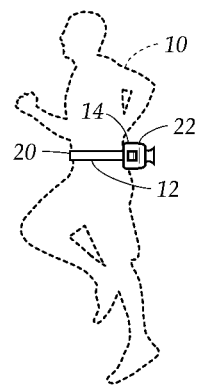
FIG. 2A is a side elevational view of a user wearing the invention and beginning the deployment process.
Figure 2B:
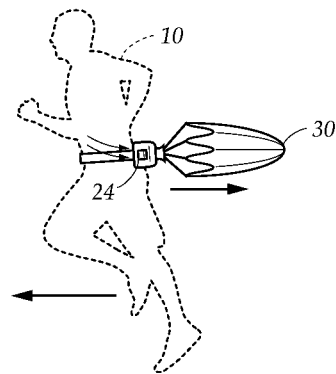
FIG. 2B is a side elevational view of the user wearing the invention as it deploys.
Figure 2C:
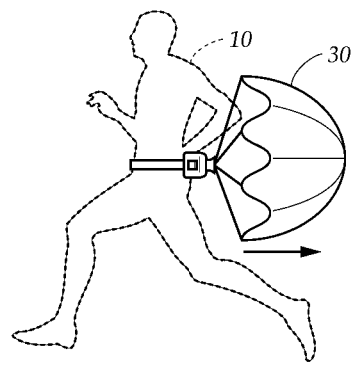
FIG. 2C is a side elevational view of the user wearing the invention fully deployed.

FIG. 2A, FIG. 2B and FIG. 2C demonstrate deployment of the parachute 30 when a user 10 wishes to increase the intensity of a workout by creating resistance through the drag of the parachute 30. In FIG. 2A, the user 10 is wearing the waist-mounted parachute deployment and retracting system 20 around the waist 12 and as the user 10 is running, he or she selectively pushes an "open" button on the case 22 worn on a user's back 14 at the waist 12. While no specific mechanism is described or illustrated, the "open" button releases the parachute 30. As would be appreciated by those possessing ordinary skill in the art, allowing the parachute to deploy by pressing the "open" button" can be accomplished in a variety of ways. Among these are selectively locking the recoil mechanism so that the cords cannot unwind, and releasing it with the open button; and selectively blocking air from reaching the parachute until the open button is pressed.

In FIG. 2B, the user's 10 forward motion causes air to move through the pair of ports 24 to inflate and deploy the parachute 30. As previously noted, one possible way of allowing the user to control the opening of the chute is to selectively block the air from reaching the parachute through the ports 24 until deployment is desired. In FIG. 2C, the user 10 continues his or her forward motion, which now requires more exertion due to the drag of the fully expanded parachute 30.

Figure 3A:
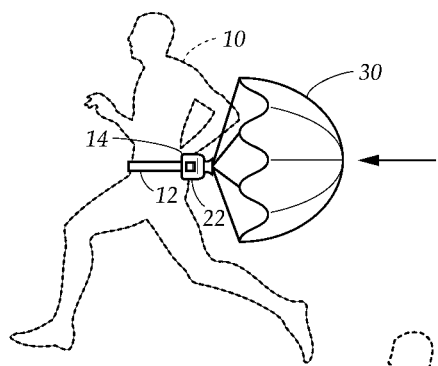
FIG. 3A is a side elevational view of a user wearing the invention and beginning the retracting process.
Figure 3B:
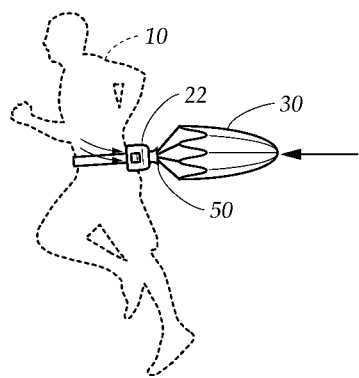
FIG. 3B is a side elevational view of the user wearing the invention as it retracts.
Figure 3C:
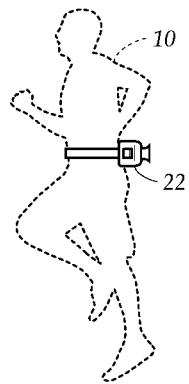
FIG. 3C is a side elevational view of the user wearing the invention fully retracted.

FIG. 3A, FIG. 3B and FIG. 3C demonstrate retraction of the parachute 30 when the user 10 wishes to resume a normal intensity workout, such as when rounding a curve on a track. In FIG. 3A, as the user 10 is running with the parachute 30 fully deployed, he or she selectively pushes a "close" button on the case 22 worn on the athlete's back 14 at the waist 12. The "close" button allows the recoil mechanism to retract the chute. The actual linking of the close button to the recoil mechanism can be accomplished in a variety of ways. Among these involves locking the recoil mechanism upon deployment to maintain energy in the mainsprings even if tension on the cords decreases, and then selectively releasing the recoil mechanism upon pressing the close button. In FIG. 3B, the recoil mechanism pulls the plurality of cords 32 into the case 22, causing the parachute 30 to deflate and retract through the aperture 50 on the case 22. In FIG. 3C, the user 10 continues his or her forward motion, which now requires normal exertion without the drag of the fully expanded parachute. The parachute is stored inside the case 22, ready to be selectively deployed again when the user 10 so desires.

It is understood that the activity described as running includes other activities involving forward horizontal motion by a user, including for example, but not limited to, walking, race walking, skating, and ice skating.

Figure 5:
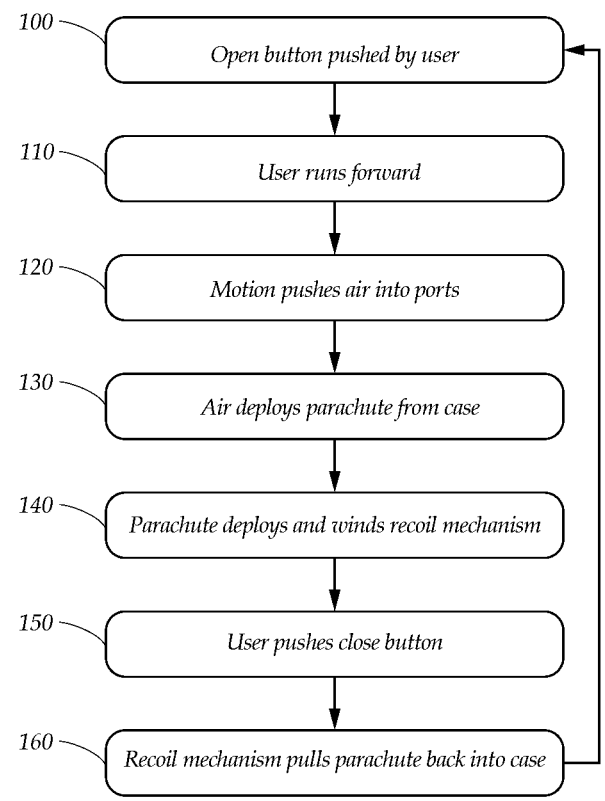
FIG. 5 is a block diagram illustrating the manner of operation of the present invention.

FIG. 5 shows in a block diagram the various steps of the system. The user selectively pushes the open button on the case 100. The user begins or continues to run in a forward direction 110. The forward motion pushes air into the air ports 120. The air deploys the parachute from the case 130. When the parachute deploys, it winds the recoil mechanism 140. When the user no longer wants or needs the added resistance, the user selectively pushes the close button to close and retract the parachute 150. The recoil mechanism retracts the parachute and pulls it back into the case 160. When the user desires the extra resistance again, he or she pushes the open button on the case 100, and again the parachute is deployed. The user can thus do interval training or sprints with or without the parachute without stopping or breaking stride.

Figure 1:
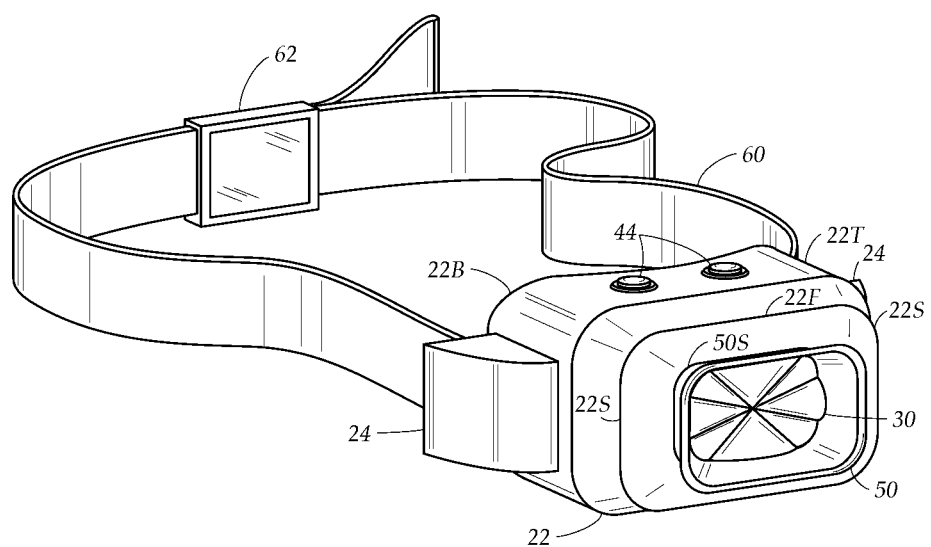
FIG. 1 is a diagrammatic perspective view of a waist-mounted parachute deployment and retracting system from the front of the invention.

FIG. 1 illustrates the apparatus of the invention in the parachute deployment and retraction system 20. The case 22 is attached to the belt, which has an adjustable fastener 62 to adjust the belt 60 to various size users. The case 22 has a top 22T, a front 22F, a back 22B and a pair of sides 22S. On the top 22T, is a pair of buttons 44, one to selectively open the parachute 30 and one to selectively close the parachute 30. On the pair of sides 22T, are the ports 24, one on each side. The pair of sides 22S taper toward the front 22F to direct the air flow from the ports 24 towards the parachute 30. The front of the system as illustrated is worn on the athlete's back at the waist, such that the front 22F is rear-facing during use and opposite the back of the athlete and the back 22 is adjacent to the athlete's back. In the front is the aperture 50 that provides an access through which the parachute 30 selectively deploys and retracts. The aperture 50 has a plurality of flared side walls 50S to assist the deployment and retraction of the parachute.

Referring again to FIG. 4, air flow caused by the user's forward motion flows through the ports 24, and is forced by the tapered sides 22S of the case 22 into the parachute 30. When the open button is selectively pushed, the parachute 30 is forced by the air flow to open, and the cords 32 are pulled away from the recoil mechanism 40. While no specific mechanism is displayed for allowing the parachute to open pressing the open button, examples of suitable mechanisms could present airflow from reaching the chute, selectively block the chute from leaving the case, or could prevent the main springs 42 from rotating. Any of these techniques and more can be used to cause the parachute to deploy upon pressing the open button.

As the cords 32 pull away, they wind the pair of mainsprings 42 in the recoil mechanism 40, storing energy therein. Preferably, the mainsprings 42 are configured to lock when fully open, to store energy therein. The parachute 30 exits the flared aperture 50, fanning out and fully expanding. It is understood that the illustration of the parachute 30 in this drawing is not to scale but to demonstrate the inventive concept. When the parachute 30 is no longer desired, the close button is selectively pushed to release the recoil mechanism, allowing the recoil mechanism 40 to use its stored energy to retract the cords 32 and pulls the parachute 30 through the aperture 50 back inside the case 22, ready to be selectively deployed when next desired.

In conclusion, herein is presented a waist-mounted parachute deployment and retracting system for training runners and other athletes. The invention is illustrated by example in the drawing figures, and throughout the written description. It should be understood that numerous variations are possible, while adhering to the inventive concept. Such variations are contemplated as being a part of the present invention.

What is claimed is:

1. An apparatus to selectively increase resistance during athletic training by providing drag, for training a user having a waist and a back, comprising:
   a belt adjustably worn around the waist of the user;
   a parachute for providing drag to increase resistance during training, the parachute having a plurality of cords;
   a case for storing the parachute, the case mounted on the belt and worn on the back of the user, the case having an aperture opposite the user, the aperture providing an access through which the parachute selectively deploys and retracts, the case having a pair of sides tapering toward the aperture, the sides having a pair of ports facing in a direction same as the user, one port on each side, the ports leading to a pair of air channels inside the case, air flowing into the pair of ports caused by a user's forward motion and into the channels forcing the parachute out the aperture once the user selectively opens the parachute, the air flow expanding the parachute and providing drag; and
   a recoil mechanism inside the case having a pair of mainsprings, the mainsprings attaching to the parachute by the cords, the cords winding the mainsprings when the parachute is selectively opened and the mainsprings retracting the parachute into the case when the parachute is selectively closed, permitting the opening and closing of the parachute without stopping or breaking stride during training.

2. The apparatus as described in claim 1, wherein the aperture has a plurality of flared side walls to assist the deployment and retraction of the parachute.

3. The apparatus as described in claim 1, wherein the case has a pair of buttons, a first button to selectively open the parachute for deploying and a second button to selectively close the parachute for retracting without stopping or breaking stride during training.

4. An apparatus to selectively deploy and retract a parachute during training without stopping or breaking stride, for training a user having a waist and a back, comprising:
   a belt adjustably worn around the waist of the user;
   a case for storing the parachute, the case mounted on the belt and worn on the back of the user, the case having an aperture opposite the user, the aperture providing an access through which the parachute selectively deploys and retracts, the case having a pair of sides, the sides having a pair of ports facing in a direction same as the user, one port on each side, the ports leading to a pair of air channels inside the case, air flowing into the pair of ports caused by a user's forward motion and into the channels forcing the parachute out the aperture once the user selectively opens the parachute, the air flow expanding the parachute and providing drag; and
   a recoil mechanism inside the case having a plurality of cords, the mechanism having a pair of mainsprings, the mainsprings attaching to the parachute by the cords, the cords winding the mainsprings when the parachute is selectively opened and the mainsprings retracting the parachute into the case when the parachute is selectively closed, permitting the opening and closing of the parachute without stopping or breaking stride during training.

5. The apparatus as described in claim 4, wherein the aperture has a plurality of flared side walls to assist the deployment and retraction of the parachute.

6. The apparatus as described in claim 4, wherein the case has a pair of buttons, a first button to selectively open the parachute for deploying and a second button to selectively close the parachute for retracting without stopping or breaking stride during training.

7. A method to selectively deploy and retract a parachute during training without stopping or breaking stride, using a system having a case mounted on a belt, the case storing the parachute, the case having a pair of buttons, a first button to selectively open the parachute and a second button to selectively close the parachute, the case having an aperture providing an access for the parachute, the case having a pair of side ports, one port on each side, the ports leading to a pair of air channels inside the case, and a recoil mechanism inside the case having a plurality of cords, the mechanism having a pair of mainsprings, the mainsprings attaching to the parachute by the cords for training a user having a waist and a back, comprising:
   deploying the parachute by moving forward, air flowing into the pair of ports caused by a user's forward motion and into the channels forcing the parachute out the aperture and winding the mainsprings of the recoil mechanism; and
   retracting the parachute by the recoil mechanism, the mainsprings rewinding the cords, pulling the parachute back into the case.

8. The method as described in claim 7, wherein the steps of deploying and retracting the parachute are selectively repeated during training, generating an interval training routine without stopping or breaking stride during training.

9. The method as described in claim 8, wherein the step of retracting the parachute further comprises pressing the close button.

10. The method as described in claim 9, wherein the step of deploying the parachute further comprises pressing the open button.

* * * * *